March 11, 1941.  O. E. ROSEN  2,234,320
METHOD OF AND MEANS FOR EDGE CUTTING OF SHEET METAL STOCK
Filed Nov. 18, 1938
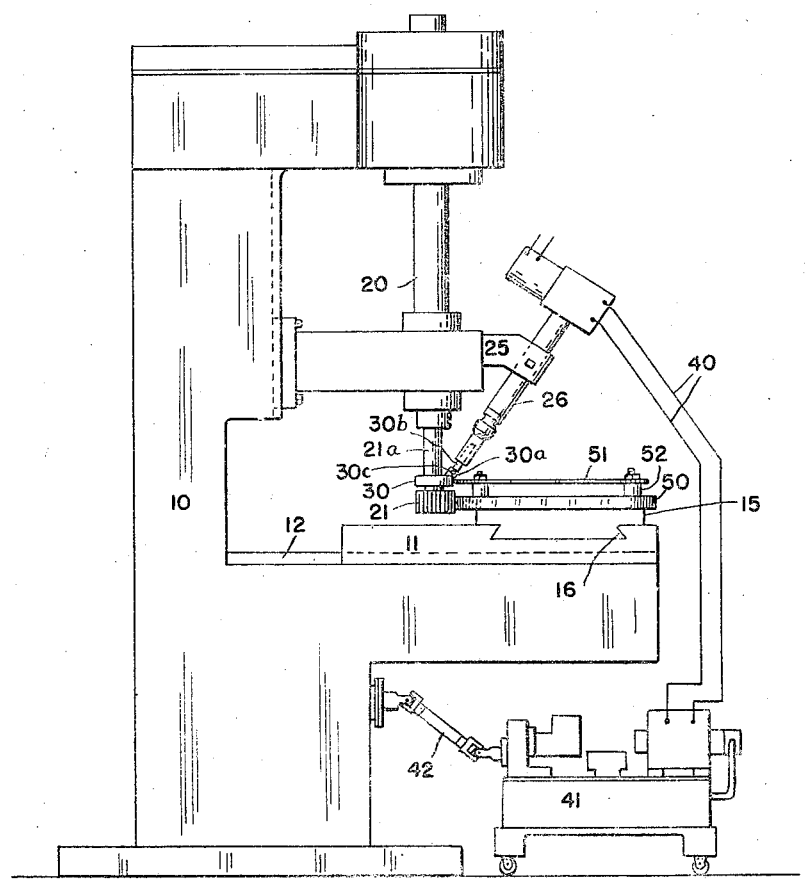
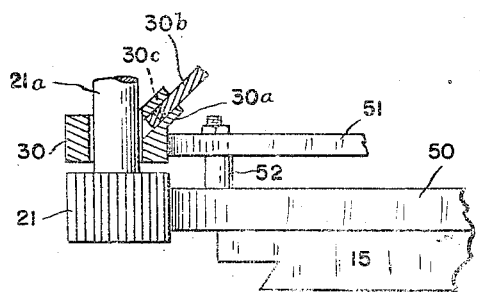
INVENTOR
OSCAR ROSEN Patented Mar. 11, 1941

2,234,320

UNITED STATES PATENT OFFICE 2,234,320

METHOD OF AND MEANS FOR EDGE CUTTING OF SHEET METAL STOCK

Oscar E. Rosen, Detroit, Mich.

Application November 18, 1938, Serial No. 241,112

3 Claims. (Cl. 90—62)

The present invention relates to a method of and means for edge cutting of sheet or plate metal stock to conform to templates.

Heretofore it has been customary, in cutting a piece of sheet or plate metal stock, to lay out the pattern of the template upon the stock work piece and mark the contour in suitable fashion and then to hand control the cutter while exercising extreme watchfulness and care. However, the most highly skilled workman is likely to produce work which is somewhat off the line either plus or minus and have to resort to filing or other means of removing excess stock. Of course, in those places where too much stock has been removed, there is nothing to be done.

In the use of duplicating machines for the purpose above indicated, the template and work stock are placed upon a work table in such positions that, while the tracer is following the template, the cutter is acting on the stock. Whenever, however, it is necessary to move either the stock or template or both, they both must be accurately positioned with respect to each other before cutting can be resumed. Such moving usually becomes necessary when changing the direction of feed, for example, from a lateral to a forward and backward feed.

An object of the present invention is to overcome these difficulties, eliminate the human equation and produce mechanically an exact reproduction of the contour of the template.

Another object is to simplify and shorten the operation by eliminating the laying out step or resetting work and template and while, using the template itself to control the cutter, eliminating the necessity for re-positioning work and template when they have had to be moved. The present invention may be practiced with any tracer controlled cutting machine but it is preferred to use such a machine as is disclosed in my previous applications hereinafter referred to.

In my prior applications, Serial No. 138,140 filed April 21, 1937, for "Duplicating machines", Patent 2,138,208, November 29, 1938, and Serial No. 146,252, filed June 3, 1937, for "Tracer for duplicating machines" there have been described, respectively, a hydraulically operated unit for actuating a feed means of a cutting machine and a tracer for controlling the direction and extent of such actuation.

The present invention has also among its objects a method of utilizing the hydraulic unit and the tracer together with a new form of tip or tracer "finger" for the purpose outlined above.

Still other objects will readily occur to those skilled in the art upon reference to the following description and drawing in which—

Figure 1 is a side elevation of a conventional representation of a milling machine and tracer controller duplicator unit illustrating the invention.

Figure 2 is an enlarged view of a portion of Figure 1 with part in section.

Figure 3 shows a modification.

In the drawing, a milling machine is represented as a whole at 10 and is indicated as being provided with a conventional platform 11, movable forward and backward upon slides 12, which platform in turn carries a work table 15 movable from right to left, and vice versa, upon slides 16.

The platform 11 and work table 15, as in any conventional machine of the type indicated, will be provided with suitable means for moving them by power or hand at will. Such means is being omitted from the drawing for the sake of clarity and simplification.

In addition to the work supporting and moving means, the machine 10 is, of course, provided with a rotatable spindle 20 for the cutter 21, and suitable means for applying power for rotating the spindle 20 and moving the platform 11 and table 15 will be present but is also not being shown.

The machine, as so far described, is conventional in all its details.

In addition to this, however, there is affixed to the machine frame a bracket 25 adapted to support a tracer unit 26 in such position that the movable tip thereof is adjacent the cutter 21. This tip is indicated at 30 and is illustrated as a ring surrounding but spaced from the cutter shank 21a and supported a suitable short distance above the cutter. It is preferred to make the ring 30 with a socket 30a at one side for the reception of a pin 30b removably fixed therein as by a set screw 30c. This pin 30b will in turn be fixed by suitable means to the movable finger of the tracer 26.

The ring 30 should be of substantially the same radius as cutter 21.

In the installation shown by way of example, the tracer 26 is connected through lead wires 40 to a cutting machine control unit 41 of the type shown in application, Serial No. 138,140, and this in turn is connected by means of the universally jointed shaft 42 to that feed means of machine 10 which moves platform 11 forward and backward.

With such an installation, the plate stock to be worked is fixed in any suitable manner to table 15 and any desired template mounted thereon but preferably spaced a short distance above the stock.

In the drawing the work stock is shown at 50, the template at 51, and spacers at 52 and these are fixed together in any suitable manner so as to be movable as a unit and detached from or secured to table 15 as a unit.

The method of operation, which would seem obvious from the above description, consists in suitably fixing the template to the work stock and the latter upon the movable work table, then arranging the tracer tip in such relation to the cutter that, while the top contacts with the template, the cutter acts upon the work.

With the automatic feed arranged to move the work, for example, laterally, the tracer, through its control of the forward and backward movement actuated by a suitable duplicator unit, such as the one shown, will follow the edge of the template and cause the cutter to reproduce this edge contour upon the stock.

As indicated by Figure 3 it is not necessary to form the tracer finger tip as a complete ring, since usually only half or less than half of the cutter's perimeter is in contact with the work at any time. This figure shows, therefore, a modified tip 130 as a semicircular member.

Now having described the invention and the preferred forms of embodiment thereof it is to be understood that it is to be limited not to the specific description but only by the claims which follow.

What I claim is:

1. A tip for the tracer of a duplicating machine having a milling cutter, consisting of an arcuate element adapted to embrace the shank of said cutter, and having its outer surface in the form of at least a part of a cylinder of substantially the same radius as that of the cutter, there being also means for securing said tip to said tracer.

2. A tip for the tracer of a duplicating machine having a milling cutter, said tip comprising a ring adapted to embrace the shank of said cutter in spaced relation thereto and of substantially the same radius as the cutter, and means for fixing said ring to said tracer.

3. A tracer tip for the tracers of duplicating cutting machines having an active rectilinear surface, for contacting a pattern, arranged at an acute angle to the axis of the tracer.

OSCAR E. ROSEN.